(12) United States Patent
Khatami et al.

(10) Patent No.: US 10,170,142 B1
(45) Date of Patent: Jan. 1, 2019

(54) SYSTEM AND METHOD FOR COMPENSATING FOR RADIAL INCOHERENCE ASSOCIATED WITH READING SERVO SECTORS

(71) Applicant: Marvell International Ltd., Hamilton (BM)

(72) Inventors: Seyed Mehrdad Khatami, Foster City, CA (US); Mats Oberg, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/708,668

(22) Filed: Sep. 19, 2017

Related U.S. Application Data

(60) Provisional application No. 62/396,957, filed on Sep. 20, 2016.

(51) Int. Cl.
*G11B 5/035* (2006.01)
*G11B 5/596* (2006.01)
*G11B 20/10* (2006.01)

(52) U.S. Cl.
CPC ...... *G11B 5/59622* (2013.01); *G11B 5/59655* (2013.01); *G11B 20/10046* (2013.01)

(58) Field of Classification Search
CPC .......... G11B 5/09; G11B 20/10; G11B 5/035; G11B 20/10046; G11B 5/02; G11B 20/10027; G11B 20/10037

USPC ............. 360/39, 65, 67; 369/124.05, 124.02, 369/59.22
See application file for complete search history.

(56) References Cited

U.S. PATENT DOCUMENTS

| | | | |
|---|---|---|---|
| 7,362,536 B1 | 4/2008 | Liu et al. | |
| 8,165,007 B2 * | 4/2012 | Honma | G11B 20/10009 369/124.05 |
| 2005/0264922 A1 | 12/2005 | Erden et al. | |

* cited by examiner

*Primary Examiner* — Nabil Hindi (57) ABSTRACT

A system for compensating RI while reading servo data from a rotating storage medium is provided and includes an equalizer, a Viterbi detector, and a servo control module. The equalizer receives a digital signal including a bit sequence of the servo data read from the rotating storage medium and equalizes the digital signal via filters. Some of the filters are to phase rotate the digital signal to generate phase rotated signals. The Viterbi detector operates based on a Viterbi state machine, which includes main branches having sub-branches, where: each of the main branches is to receive the phase rotated signals respectively at corresponding ones of the sub-branches; and the Viterbi detector is to determine branch metrics for each of the sub-branches, determine a minimum branch metric for each of the main branches, and process the minimum branch metric using an add-compare-select process to determine a most likely received bit sequence.

20 Claims, 6 Drawing Sheets

SYSTEM AND METHOD FOR COMPENSATING FOR RADIAL INCOHERENCE ASSOCIATED WITH READING SERVO SECTORS

CROSS-REFERENCE TO RELATED APPLICATIONS

This application claims the benefit of U.S. Provisional Application No. 62/396,957, filed on Sep. 20, 2016. The entire disclosures of the applications referenced above are incorporated herein by reference.

FIELD

The present disclosure relates to magnetic recording systems and more particularly to radial incoherence compensation during reading of servo sectors.

BACKGROUND

A disk drive includes a magnetic storage medium that is rotated by a spindle motor. Data is stored on the magnetic storage medium in concentric tracks, where each track includes multiple sectors. The sectors include data sectors and servo sectors. The servo sectors store servo information, such as a preamble, synchronization (synch) mark, gray code, etc. A servo controller is used to determine a location of a read/write head relative to the tracks and/or sectors based on the servo information.

A radial incoherence detector can be used to detect radial incoherence during reading of servo sectors. Radial incoherence refers to an offset in a circumferential direction between two radially adjacent servo sectors, which causes a timing offset between servo information read from the radially adjacent servo sectors. During writing of servo data, start and end locations of radially adjacent servo sectors can be misaligned. When the head is performing a seek operation including passing the head over adjacent sectors in a radial direction, this misalignment in the servo sectors is detected by the radial incoherence detector. Since each servo sector essentially includes the same servo information, radial incoherence would be 0 if the radially adjacent servo sectors were circumferentially aligned. In a typical magnetic recording medium however, this misalignment between radial adjacent servo sectors can consistently change in a random pattern.

Traditional radial incoherence detectors typically estimate an amount of radial incoherence based on an output of a filter and/or a past decision of a Viterbi detector. The estimated radial incoherence is then compensated for in future decisions of the Viterbi detector. There is a delay from when the radial incoherence is estimated to when the compensation occurs. This delay causes compensation values determined for first received servo information to be later used for second (or later received servo information). The later received servo information may have a different radial incoherence than the first received servo information. As a result, the radial incoherence compensation is inaccurate.

SUMMARY

A system for compensating radial incoherence while reading servo data from a rotating storage medium is provided. The system includes an equalizer, a Viterbi detector, and a servo control module. The equalizer (i) receives a digital signal including a bit sequence of the servo data read from the rotating storage medium, and (ii) equalizes the digital signal via filters, wherein at least some of the filters are to phase rotate the digital signal to generate phase rotated signals. The Viterbi detector operates based on a trellis state machine, wherein the trellis state machine includes main branches, where: each of the main branches includes sub-branches; where each of the main branches is to receive the phase rotated signals respectively at corresponding ones of the sub-branches; and the Viterbi detector is to (i) determine branch metrics for each of the sub-branches, (ii) determine a minimum branch metric among all the branch metrics of the sub-branches for each of the main branches, and (iii) process the minimum branch metric as a representative of a corresponding branch using an add-compare-select process of the Viterbi detector to determine a most likely received bit sequence. The servo control module adjusts a location of a read/write head of the rotating storage medium based on the most likely received bit sequence.

In other features, a system for compensating radial incoherence while reading servo data from a rotating storage medium is provided. The system includes an equalizer, a Viterbi detector and a servo control module. The equalizer includes a filter and phase rotators. The filter (i) receives a digital signal including a bit sequence of the servo data read from the rotating storage medium, and (ii) filters the digital signal. At least some of the phase rotators are to phase rotate an output of the filter to provide a respective one of phase rotated signals. The Viterbi detector operates based on a trellis state machine, wherein the trellis state machine includes multiple main branches. Each of the main branches includes sub-branches. Each of the main branches is to receive the phase rotated signals respectively at corresponding ones of the sub-branches. The Viterbi detector is to (i) determine branch metrics for each of the sub-branches, (ii) determine a minimum branch metric among all the branch metrics of the plurality of sub-branches for each of the main branches, and (iii) process the minimum branch metric as a representative of a corresponding branch using an add-compare-select process of the Viterbi detector to determine a most likely received bit sequence. The servo control module adjusts a location of a read/write head of the rotating storage medium based on the most likely received bit sequence.

In yet other features, a method for compensating radial incoherence while reading servo data from a rotating storage medium is provided. The method includes: receiving a digital signal including a bit sequence of the servo data read from the rotating storage medium; equalizing the digital signal via at least one filter; rotating the digital signal or at least one output of the at least one filter to generate phase rotated signals, where the phase rotated signals are generated concurrently; and receiving at each of multiple main branches of a Viterbi detector the phase rotated signals. The Viterbi detector operates based on a trellis states machine. The trellis state machine includes main branches. Each of the main branches includes sub-branches. The phase rotated signals are received respectively at corresponding ones of the sub-branches, The method further includes: determining branch metrics for each of the sub-branches; determining a minimum branch metric among all the branch metrics of the sub-branches for each of the main branches; processing the minimum branch metric as a representative of a corresponding branch using an add-compare-select process of the Viterbi detector to determine a most likely received bit sequence; and adjusting a location of a read/write head of the rotating storage medium based on the most likely received bit sequence.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Traditional radial incoherence detectors that estimate an amount of radial incoherence based on an output of a filter and/or a past decision of a Viterbi detector are incapable of accurately compensating for random radial incoherence due to delay associated with the corresponding compensation. The examples set forth below include systems and methods for accurately compensating for random radial incoherence. The compensation is provided without delay and thus is applied to the correct corresponding servo information and/or data. This compensation is referred to as "on-the-fly" RI compensation.

Figure 1:
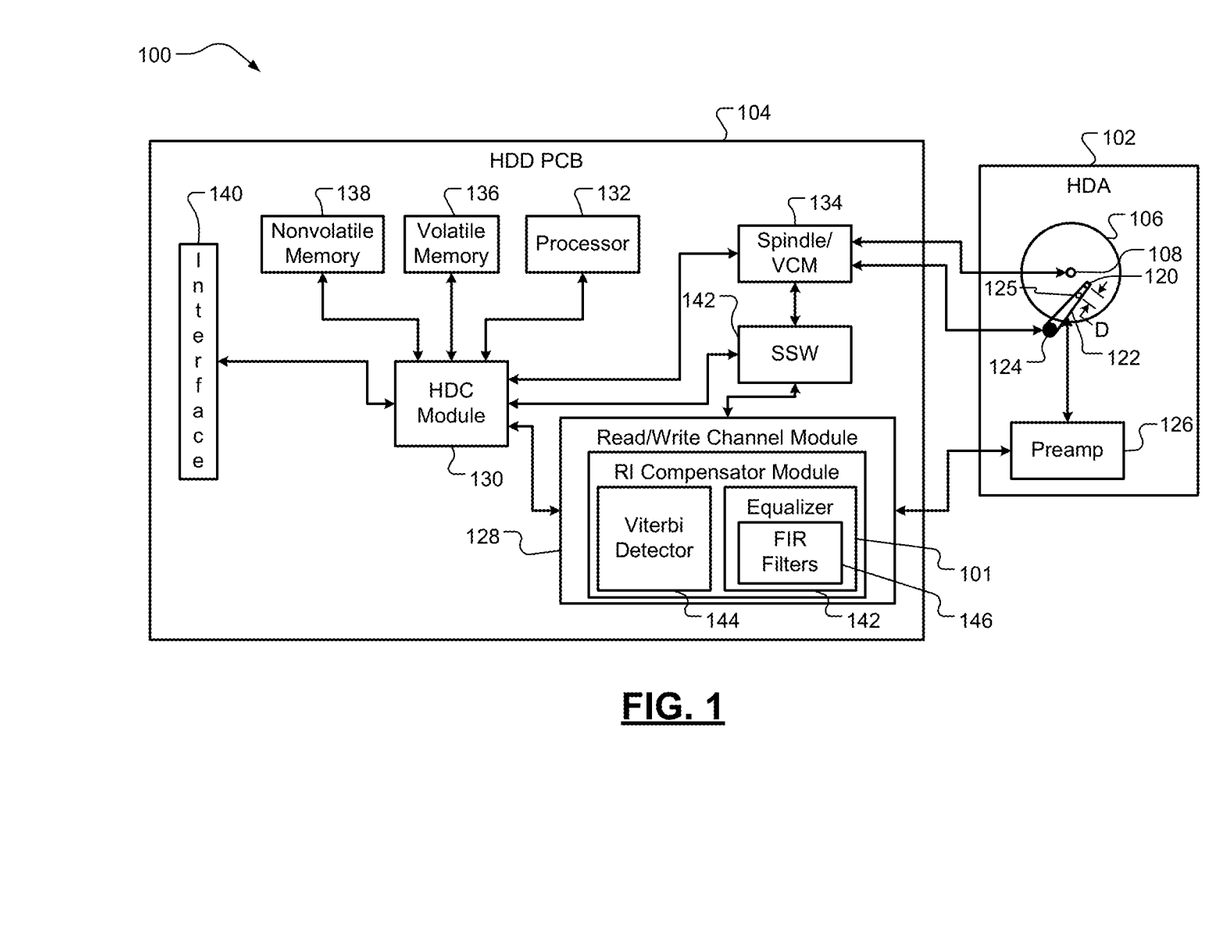
FIG. 1 is a functional block diagram of an example of a hard disk drive system incorporating a radial incoherence (RI) compensator module in accordance with the present disclosure.

FIG. 1 shows a hard disk drive (HDD) system 100 of a hard disk drive. The HDD system 100 includes a RI compensator module 101. The RI compensator module 101 compensates for RI associated with reading servo sectors. The HDD system 100 includes a hard disk assembly (HDA) 102 and a HDD printed circuit board (PCB) 104. The HDA 102 includes one or more circular platters (i.e. disks) 106, which have magnetic surfaces that are used to store data magnetically. Data can be stored in either a continuous media format or bit-patterned format on the disks 106. The disks 106 are arranged in a stack, and the stack is rotated by a spindle motor 108. At least one read and write head assembly 120 (read/write head assembly 120) reads data from and writes data on the magnetic surfaces of the disks 106.

The write head assembly 120 includes a write element (write head), such as an inductor, that generates a magnetic field and a read element (read head), such as a magneto-resistive (MR) element, that senses the magnetic field on the disks 106. The write head assembly 120 is mounted at a distal end of an actuator arm 122. An actuator, such as a voice coil motor (VCM) 124, moves the actuator arm 122 relative to the disks 106.

The write head assembly 120 may include a synchronization sensor 125 or the synchronization sensor 125 may be mounted elsewhere, such as on the actuator arm 122 a distance D from the write head assembly 120, as shown. The distance D is fixed. The synchronization sensor 125 may be an optical sensor, a magnetic sensor, or other suitable sensor. An optical sensor may be used to detect a landscape of bit islands and grooves (non-magnetic areas between bit islands) of the BPM. A magnetic sensor may be used to detect magnetic fields around the bit islands.

The synchronization sensor 125 may be active while the write head is writing to the disks 106. In one implementation, the synchronization sensor 125 is not included and the read element is used as a synchronization sensor. The signals or magnetic field generated by the write head may be shielded away prior to being received by the read head to prevent the write head from negatively affecting operation of the read head. This allows the read head to be used as a synchronization sensor and be active while the write head is writing to the disks 106.

The HDA 102 includes a preamplifier device 126 that amplifies signals received from and sent to the write head assembly 120. The preamplifier device 126 generates a write current that flows through the write element of the write head assembly 120 when writing data. The write current is used to produce a magnetic field on the magnetic surfaces of the disks 106. Magnetic surfaces of the disks 106 induce low-level analog signals in the read element of the write head assembly 120 during reading of the disks 106. The preamplifier device 126 amplifies the low-level analog signals and outputs amplified analog signals to a read/write channel module 128.

Figure 3:
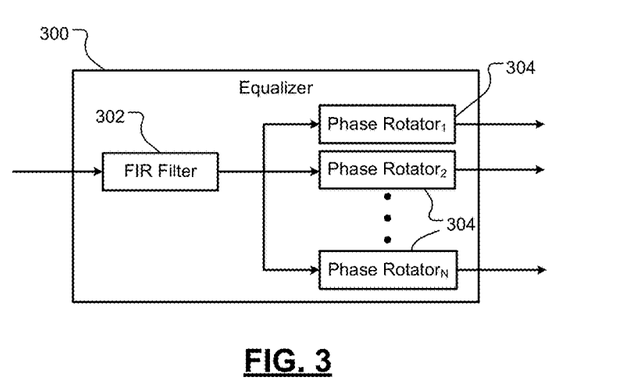
FIG. 3 is an example of an equalizer in accordance with another embodiment of the present disclosure.

The HDD PCB 104 includes the read/write channel module 128, a hard disk controller (HDC) 130, a processor 132, a spindle/VCM driver module 134, volatile memory 136, nonvolatile memory 138, and an input/output (I/O) interface 140. The read/write channel module 128 includes the RI compensator module 101. The RI compensator module 101 includes an equalizer 142 and a Viterbi detector 144. The equalizer 142 may include finite impulse response (FIR) filters 142, as shown, or a FIR filter and multiple phase rotators. An example of an equalizer including a FIR filter and multiple phase rotators is shown in FIG. 3. The FIR filters 142 filter servo read signals received from the pre-amplifier device 126. Operation of the equalizer 142 and the Viterbi detector 144 in combination provide on-the-fly RI compensation, as further described below.

During write operations, the read/write channel module 128 may modulate and encode the data to increase reliability by using error-correcting codes (ECC), such as run length limited (RLL) code, Reed-Solomon code, Manchester Code (referred to as SMCO), etc. The read/write channel module 128 then transmits the modulated and encoded data to the preamplifier device 126. Data may then be written to bit islands based on synchronized write clock signals. During read operations, the read/write channel module 128 receives analog signals from the preamplifier device 126. The read/write channel module 128 converts the analog signals into digital signals, which are decoded via the Viterbi detector 144 to recover the original data.

The HDC module 130 controls operation of the HDD system 100. For example, the HDC module 130 generates commands that control the speed of the spindle motor 118 and the movement of the actuator arm 122. The spindle/ VCM driver module 134 implements the commands and generates control signals that control the speed of the spindle motor 118 and the positioning of the actuator arm 122. Additionally, the HDC module 130 communicates with an external device (not shown), such as a host adapter within a host device, via the interface 140. The HDC module 130 may receive data to be stored from the external device, and may transmit retrieved data to the external device.

The processor 132 processes data, including encoding, decoding, filtering, and/or formatting. Additionally, the processor 132 processes servos or positioning information to position the read/write head assembly 120 over the disks 106 during read/write operations. Servo, which is stored on the disks 106, ensures that data is written to and read from correct locations on the disks 106. In some implementations, a self-servo write (SSW) module 150 may write servo sectors on the disks 106 using the write head assembly 120 prior to storing user data on the disks 106.

Figure 2:
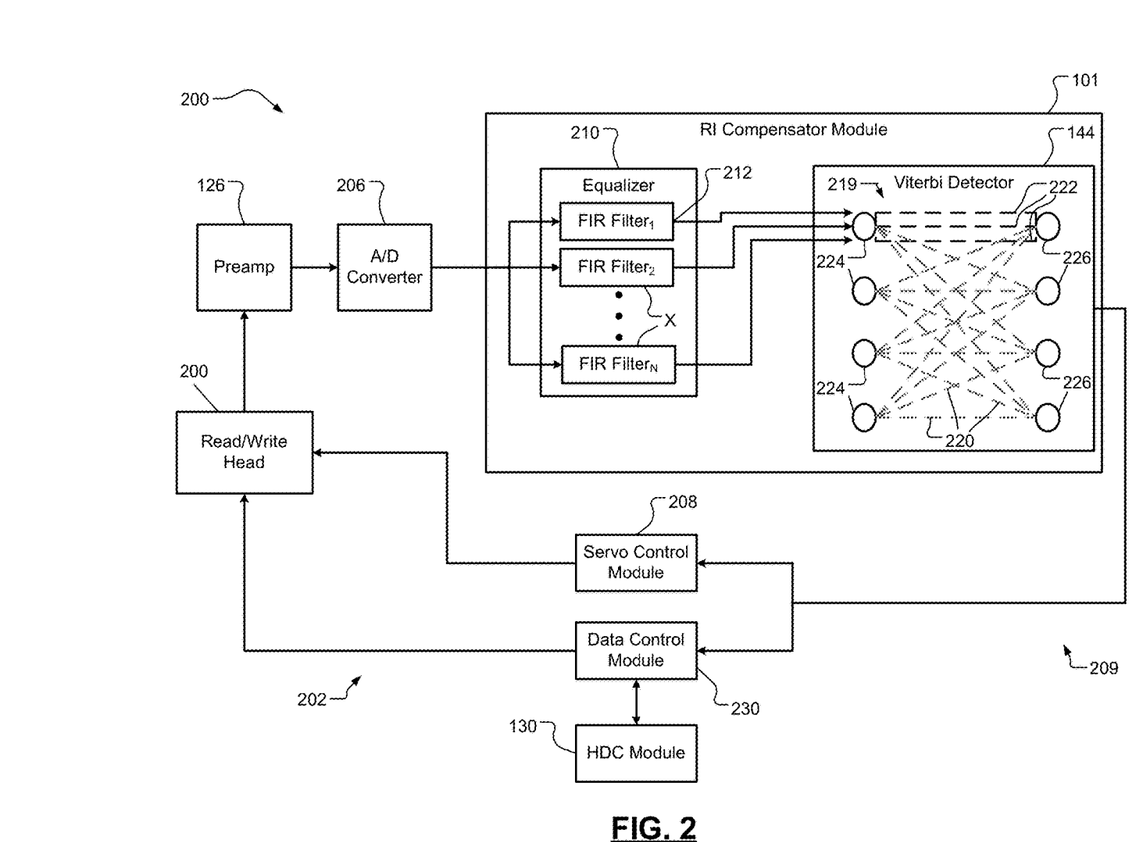
FIG. 2 is a functional block diagram of an example of a servo channel and write channel of the hard disk drive system of FIG. 1.

FIG. 2 shows a servo channel 200 and write channel 202 of the hard disk drive system 100 of FIG. 1. The servo channel 200 includes the read/write head 204, which may be part of the head assembly 120 of FIG. 1. The servo channel 200 further includes the preamplifier device 126, an analog-to-digital (A/D) converter 206, and an RI compensation system 207. The RI compensation system 207 includes the RI compensator module 101 and a servo control module 208. The preamplifier device 126 amplifies signals received from the read/write head 204. The A/D converter 206 converts amplified analog signals from the preamplifer device 126 to digital signals, which are provided to the RI compensator module 101.

The RI compensator module 101 includes an equalizer 210 (e.g., the equalizer 146 of FIG. 1) and the Viterbi detector 144. The equalizer 210, as shown, includes multiple FIR filters 212 connected in parallel. Each FIR filter filters a received digital signal while the other ones of the FIR filters filter the digital signal. The equalizer 210 receives and filters the digital signal from the A/D converter 206. The equalizer 210 may include two or more FIR filters. In one embodiment, the equalizer 210 includes three FIR filters; the first FIR filter is not phase rotated, the second FIR filter is phase rotated by a positive branch phase (+$\phi$), and the third FIR filter is phase rotated by a negative branch phase (−$\phi$). In another embodiment, N FIR filters are connected in parallel, where N is greater than 3. In another embodiment, a same number of negative phase rotated FIR filters are used as a number of positive phase rotated FIR filters. In one another embodiment, a center (or main) FIR filter does not rotate the digital signal, a first set of FIR filters rotate the digital signal by respective negative amounts of phase, and a second set of FIR filters rotate the digital signal by respective positive amounts of phase.

The Viterbi detector 144 may perform a trellis diagram approximation to determine the most likely input sequence provided to the Viterbi detector. This includes performing maximum likelihood decoding to determine a code word with a minimum distance between a received bit sequence and the code word. The Viterbi detector 144 includes a trellis state machine 219 with main branches represented by dashed lines 220. Each of the main branches includes multiple sub-branches. Sub-branches for one of the main branches are shown and represented by dashed lines 222. Although not shown for simplicity, each of the main branches includes multiple sub-branches. In one embodiment, each of the main branches includes a same number of sub-branches. In another embodiment, the number of sub-branches of each of the main branches is equal to the number of the FIR filters 212 in the equalizer 210. Each of the outputs of the FIR filters 212 is provided to a respective one of the sub-branches 222 of each of the main branches 220. For example, if the equalizer 210 includes three FIR filters, then the outputs of the FIR filters are provided respectively to the sub-branches of each of the main branches. In the example shown, the output of the first FIR filter is provided to the first one of the sub-branches 222 of a first main branch. The output of the second FIR filter is provided to the second one of the sub-branches 222 of the first main branch. The output of the N$^{th}$ FIR filter is provided to the N$^{th}$ one of the sub-branches 222 of the first main branch. This is true for the sub-branches of each of the main branches 220.

The main branches and sub-branches of the Viterbi detector 144 extend from input nodes 224 representing states of input symbols to output nodes 226 representing states of output symbols. In the simplified example shown, two symbol bits are being transferred at a time, where each input state and output state represents one of four possible states of the two symbol bits. The Viterbi detector 144 may include any number of input nodes and output nodes. The Viterbi detector 144 performs approximations based on servo data received from the FIR filters 212 to compensate for radial incoherence. Operation of the equalizer 210 and the Viterbi Detector 146 are further described below.

The servo control module 208 receives RI compensated servo values from the Viterbi detector 144 and controls the VCM 124 to follow a servo sector and/or track and/or seek the read/write head 204 to a predetermined servo sector. The servo control module 208 controls the VCM 124 based on the RI compensated servo values.

The write channel 202 includes a data control module 230 and the read/write head 204. The servo control module 208 and the data control module 230 may be implemented as part of the HDC module 130 or may be separate from the HDC module 130 as shown. The data control module 230 formats (i) user data read from the disks 106 via the read/write head 204 and forwards the user data to the HDC module 130, and (ii) user data received from the HDC module 130, which is then written to the disks 106 via the read/write head 204. The data control module 230 may convert the user data (i) read from the disks 106 from an analog form to a digital form, and (ii) written to the disks 106 from a digital form to an analog form.

FIG. 3 shows an equalizer 300 that may replace the equalizer 210 of FIG. 2. The equalizer 300 includes a FIR filter 302 and phase rotators 304. The FIR filter 302 receives and filters an output of the A/D converter 206 of FIG. 2. The phase rotators 304 receive and may phase rotate a filtered output of the FIR filter 302. In another embodiment, one of the phase rotators 304 does not phase rotate the output of the FIR filter 302. In yet another embodiment, the phase rotators 304 have different respective amounts of phase rotation. In an embodiment, there are an equal number of phase rotators providing negative phase rotation as there is providing positive phase rotation. In one another embodiment, a center (or main) phase rotator does not rotate the digital signal, a first set of phase rotators rotate the digital signal by respective negative amounts of phase, and a second set of phase rotators rotate the digital signal by respective positive amounts of phase.

As an example, the phase rotation may be performed based on a look-up table stored in memory and a phase control signal. The phase control signal indicates the amount of phase rotation. The look-up table may relate (a) bit values represented by voltages output by the FIR filter and the amount of phase rotation to phase rotated bit values, and/or (b) in-phase (i) and quadrature-phase (q) components of the bit values represented by voltages output by the FIR filter to phase rotated bit values. The phase rotators 304 output phase rotated signals. In one embodiment, the phase rotators 304 are convolved with the FIR filter 302. An example of this is provided by the equalizer 210 of FIG. 2, where the convolving of the phase rotators 304 with the FIR filter 302 of FIG. 3 provides the respective FIR filters 212 of FIG. 2. The outputs of the FIR filters 212 of FIG. 2 and/or the outputs of the phase rotators 304 of FIG. 3 may be floating point values.

Figure 4:
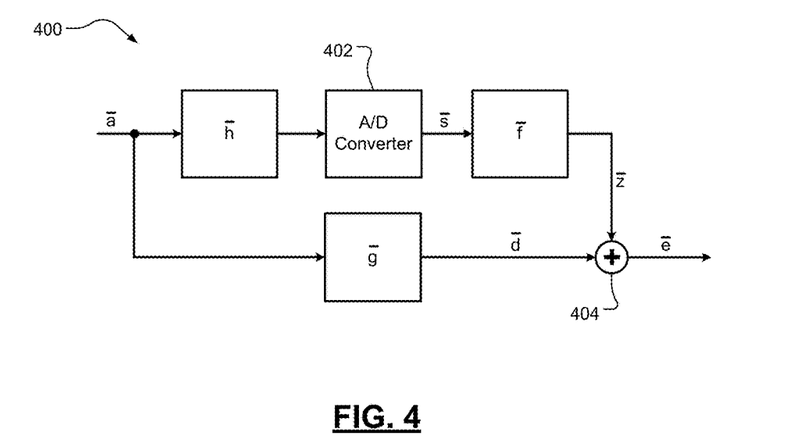
FIG. 4 is block diagram representing a portion of a servo channel.

FIG. 4 shows a block diagram representing a portion 400 of a servo channel, where $\bar{a}$ is a vector representing a channel input sequence, $\bar{h}$ is a vector representing a magnetic recording architecture and noise and distortions, $\bar{s}$ is a vector representing a sample signal out of an A/D converter 402 (e.g., the A/D converter 206 of FIG. 2), $\bar{f}$ is a vector representing an equalizer (e.g., the equalizer 210 of FIG. 2), $\bar{z}$ is a vector representing an output vector of the equalizer, $\bar{g}$ is a vector representing a target response provided by a Viterbi detector (e.g., the Viterbi detector 144 of FIGS. 1-2), $\bar{d}$ is a vector representing a predetermined or ideal channel output (i.e. output of the target response), and $\bar{e}$ is a vector representing an error between the output vectors $\bar{z}$, $\bar{d}$. The magnetic recording architecture includes a read/write head (e.g., the read/write head 204 of FIG. 2). The error vector $\bar{e}$ is a difference between the output vectors $\bar{z}$, $\bar{d}$, which may be generated by a summer 404.

The target response vector $\bar{g}$ is used by the Viterbi detector 144 to determine branch metrics. The target response vector $\bar{g}$ is a set of predetermined values. As an example, the values of a target response vector $\bar{g}$ for a partial response four (PR4) target may be [1 0 −1]. The target response vector $\bar{g}$ is set in the Viterbi detector 144 and corresponds to the equalizer vector $\bar{f}$. The target response vector $\bar{g}$ and the equalizer vector $\bar{f}$ are a match pair, such that if one of $\bar{g}$ and $\bar{f}$ are changed, the other is also changed. The equalizer vector $\bar{f}$ equalizes the sample signal vector $\bar{s}$ to minimize the error vector $\bar{e}$.

The channel input sequence vector $\bar{a}$ convolved with the target response vector $\bar{g}$ provides branch metrics. As an example, a channel input sequence of [1 1 1 0 0 0] convolved with the target response vector $\bar{g}$ may provide a first branch metric. A channel input sequence of [0 0 0 1 −1 1] convolved with the target response vector $\bar{g}$ may provide a second branch metric.

Figure 5:
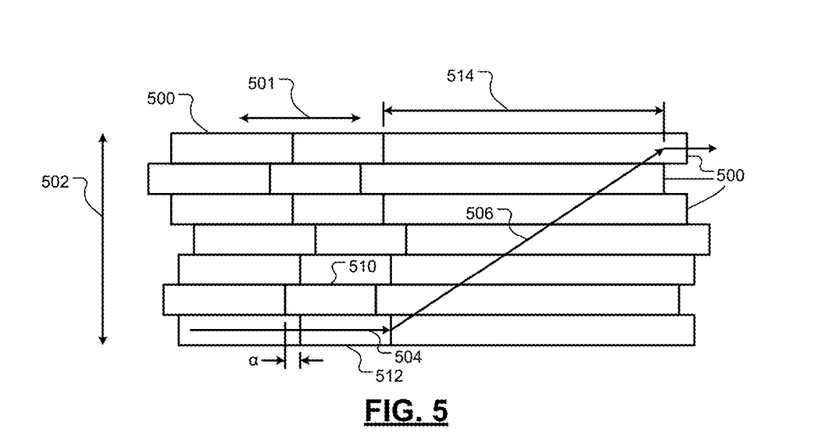
FIG. 5 is a diagram of sectors of a portion of a rotating storage medium illustrating radial incoherence detectable during a seek operation.

FIG. 5 shows sectors 500 of a portion of a rotating storage medium (or disk) illustrating radial incoherence detectable during a seek operation. Arrow 502 indicates the radial direction of the sectors 500. Arrow 501 indicates a circumferential direction of the sectors 500. Arrow 504 indicates a seek operation performed along sectors in a same row. Arrow 506 indicates a seek operation performed across radially adjacent sectors. As is shown, the start and end locations of radially adjacent sectors are misaligned and thus the radially adjacent sectors are circumferentially offset from each other and thus were not written with the same timing. As an example, circumferential offset a between sectors 510, 512 is shown. Due to the circumferential offsets, during a seek operation across radially adjacent sectors, servo data is read with a timing offset. The amount of circumferential offset at any moment in time corresponds to the sector over which a read/write head is located. Due to the consistent changing in the amount of circumferential offset, the RI is also consistently changing. The RI between radial adjacent sectors is proportional to the amount of corresponding circumferential offset of the sectors. As an example, the distance traveled by the read/write head in the circumferential direction and/or the length of the sectors over which the seek operation is performed, as represented by arrow 506, corresponds to 60 bits. This distance and/or length is represented by arrow 514.

Figure 6:
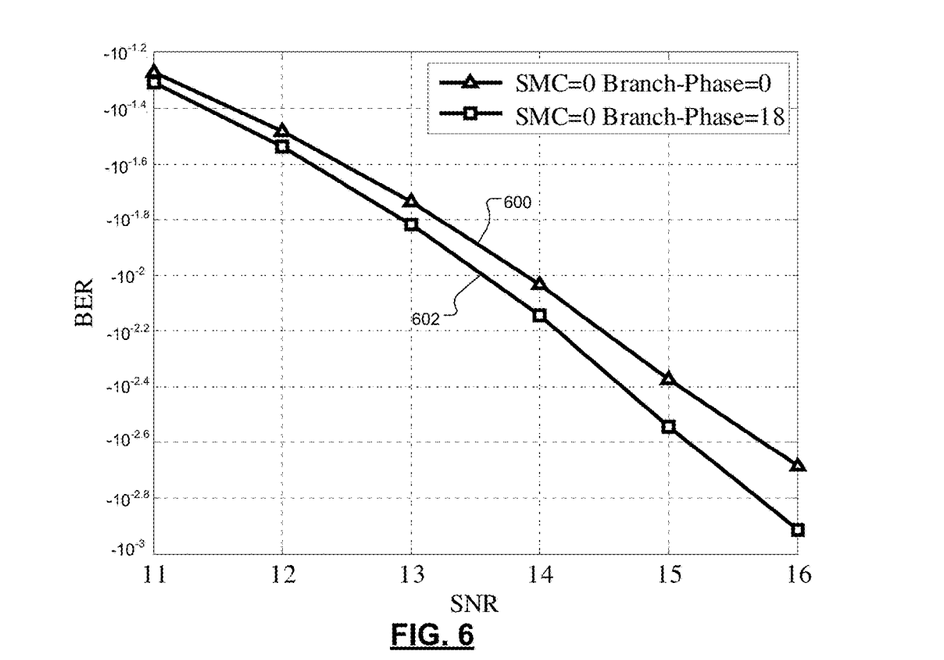
FIG. 6 is a plot illustrating an example of gains when RI compensation is enabled versus when RI compensation is disabled for the RI compensator module of FIG. 1.

FIG. 6 shows example gains when RI compensation is enabled versus when RI compensation is disabled for the RI compensator module 101 of FIGS. 1-2, which may be provided while performing the seek operation represented by arrow 506 of FIG. 5. The radial incoherence systems disclosed herein provide consistent improvements in compensating for random radial incoherence without adding delay. The improvements include increased gain with minimal loss. The term "gain" as used herein refers to an increase in values of a relationship between bit error rates (BERs) and signal-to-noise (SNRs) of a radial incoherence system. The term "loss" as used herein refers to a minimal decrease in values of the relationship between BERs and SNRs.

FIG. 6 is shown for an example embodiment where the number of FIR filters and phase rotators (if included) is 3, where the first FIR filter and/or phase rotator rotates a received digital signal by a negative phase, the center FIR filter and/or phase rotator does not rotate the digital signal, and the third FIR filter and/or phase rotator rotates the digital signal by a positive phase. The magnitude of the negative phase is equal to the magnitude of the positive phase. FIG. 6 is shown for a simulation where: a maximum RI (or RI-phase) is 60°; a truncated normal distribution of the RI has a standard deviation σ of 20°; a gray code length of 60 bits; the gray code length is a same as the movement length in the circumferential direction of the read/write head; a modulation code is the Manchester code; a target is PR4. A RI-phase of 90° represents a single bit shift of a channel. FIG. 6 shows to curves; the first curve 600 is for a branch phase of 0°, which means that RI detector is disabled, and the second curve 602 is for a branch phase of 18°. Branch phase of 18° means that three FIR filters/phase rotators are rotating the phase with −18°, 0 and 18°. The branch phase refers to the magnitude of phase rotation performed by the first and third FIR filters and/or phase rotators. The RI compensation is disabled for the first curve 600. The RI compensation is enabled for the second curve 602.

As can be seen, the gain, defined by the lower BERs and/or the slope of the curves showing faster decrease of the BER 600, 602, is better for curve 602 than for curve 600. The BERs are shown in the logarithmic domain. Thus, the disclosed RI compensation provides improved results when enabled over when not enabled. The gains provided by the disclosed RI compensation are not provided by traditional RI detectors, which estimate an amount of radial incoherence and/or have delays associated with performing RI compensation. The traditional RI detectors are more sensitive to noise than the disclosed RI compensation and thus do not provide accurate results for random RI.

Figure 7:
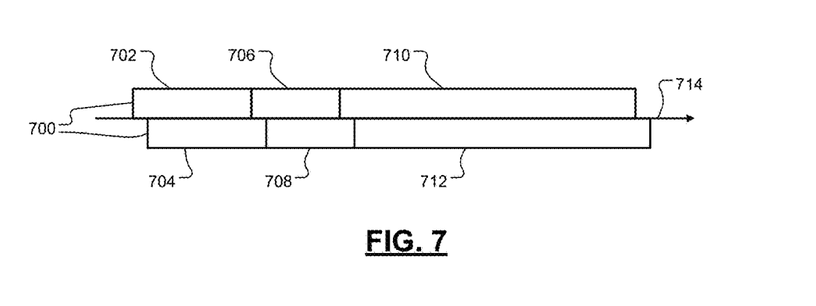
FIG. 7 is a diagram of radial adjacent sectors of a rotating storage medium illustrating an example of when RI is fixed.

FIG. 7 shows radial adjacent sectors 700 of a rotating storage medium as an example of when RI is fixed. The sectors include respective preambles 702, 704, synch marks 706, 708, and gray codes 710, 712. FIG. 7 is an example of when a seek operation is performed along the sectors in a circumferential direction and RI is fixed.

Figure 8:
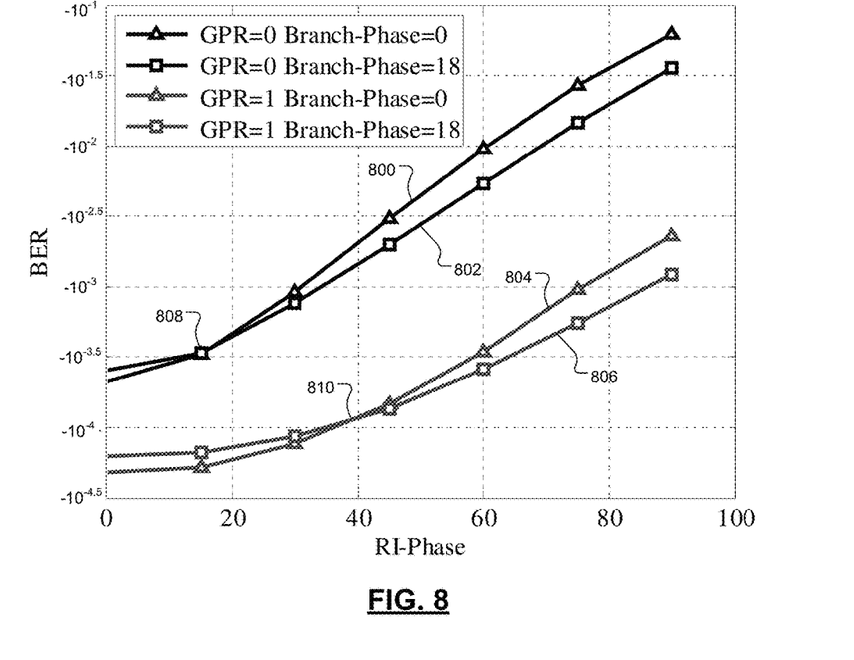
FIG. 8 is a plot illustrating examples of bit error rates relative to different fixed RI phases for the RI compensator module of FIG. 1.

FIG. 8 shows BERs relative to different fixed RI phases for the RI compensator module 101 of FIGS. 1-2. The RI may be fixed during a seek operation, as illustrated in FIG. 7. Four curves 800, 802, 804, 806 are shown respectively for: GPR=0 and branch phase is 0°; GPR=0 and branch phase is 0°; GPR=1 and branch phase is 18°; and GPR=1 and branch phase is 18°. The label GPR=1 refers to a minimum mean square error (MMSE) target based on a monic constraint [1 x y], and GPR=0 refers to PR4 [1 0-1] as the target response. FIG. 7 is shown for a simulation where: a maximum RI (or RI-phase) is 90°; the read/write head 200 is positioned in the middle of the sectors 700 (shown by arrow 714); the length of the gray code 710, 712 is 60 bits; the modulation code of the servo data is the Manchester code; the SNR is 16; and the branch phase is 0° when RI compensation is disabled and is 18° when RI compensation is enabled.

As shown, cross-over points 808, 810 exist for each of the pairs of curves 800, 802 and 804, 806. Gain increases from the cross-over points 808, 810 and as the RI-phase increases. Loss increases from a RI-phase of the cross-over points 808, 810 and as the RI-phase decreases. As shown, the loss decreases from a RI-phase of 0° to a RI-phase of the cross-over points 808, 810. The gains are provided independent of the GPR. In other words, enabling RI detection in presence of relatively small amount of RI slightly degrades the performance in terms of BER. However, the values of the gains provided by the RI detection in high RI regions are greater, since, those are the regions experiencing high BER. The RI detector improves the much needed worst BER region while minimally degrading the lowest BER region. The gains are provided independent of the channel corresponding target (GPR=0 or 1).

Figure 9:
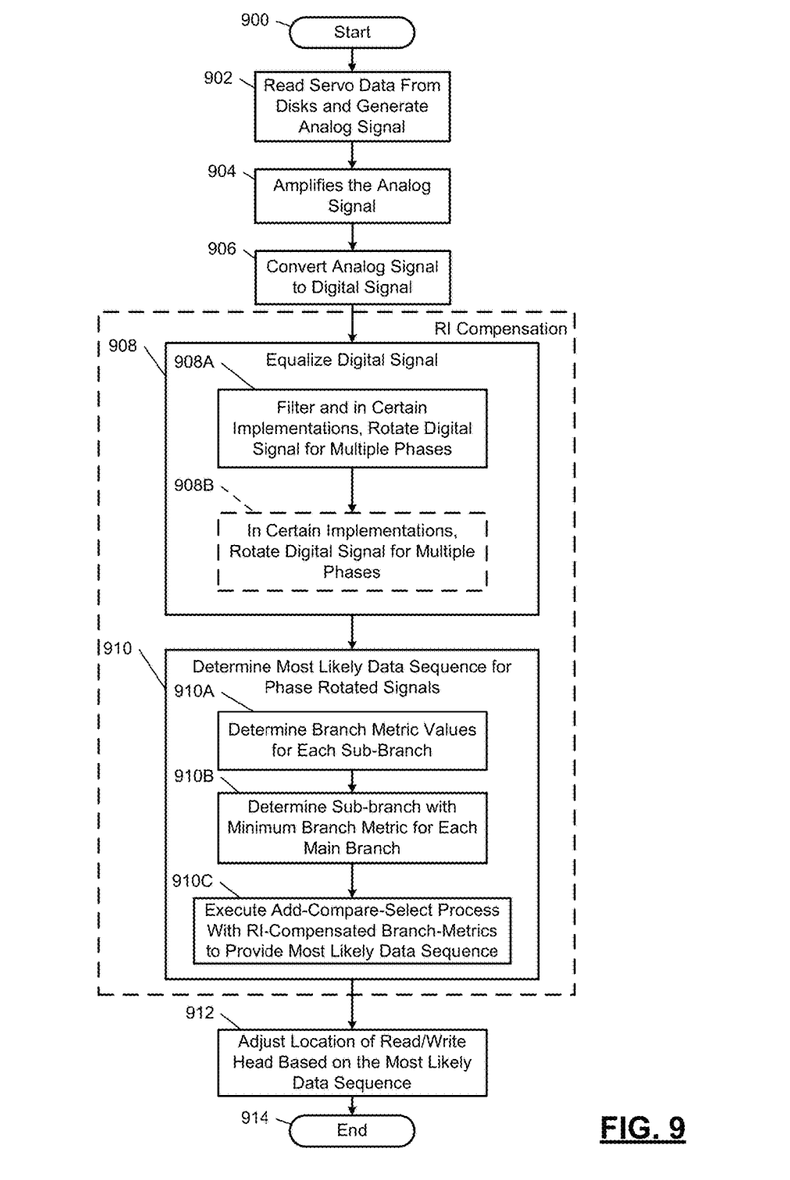
FIG. 9 illustrates a RI compensation method in accordance with an embodiment of the present disclosure.

Operations of the servo channel 200 and RI compensation module 101 of FIG. 2 are further described below with respect to the method of FIG. 9. An example of a RI compensation method is illustrated in FIG. 9. Although the following operations are primarily described with respect to the implementations of FIG. 2, the operations may be modified to apply to other implementations of the present disclosure. The operations may be iteratively performed.

The method begins at 900. At 902, the read/write head 204 reads servo data from disks 106 of FIG. 1 and outputs an analog signal. At 904, the preamplifier device 126 amplifies the analog signal. At 906, the A/D converter 206 samples the analog signal to generate a digital signal.

The following operations 908-910 in combination provide RI compensation. At 908, the equalizer 210 receives and equalizes the digital signal. At 908A, one or more FIR filters (e.g., the FIR filters 212 of FIG. 2 or FIR filter 302 of FIG. 3) filter the digital signal. If the equalizer 210 is implemented as shown in FIG. 2, the digital signal may be phase rotated by 2 or more FIR filters as described above. Not all of the FIR filters are required to rotate the digital signal. In an embodiment of the equalizer 210, the number of negative phase rotating FIR filters and the number of positive phase rotating FIR filters are the same, where the magnitudes of the negative amounts of phase rotation of the negative phase rotating FIR filters are equal to respectively magnitudes of the positive amounts of phase rotation of the positive phase rotating FIR filters. At 908B, if the equalizer 210 is implemented as shown in FIG. 3, phase rotators (e.g., the phase rotators 304) rotate outputs of the FIR filter (e.g., FIR filter 302). Operations 908A, 908B include the FIR filters 212 and/or the phase rotators 304 phase rotating the received digital signal by predetermined phase amounts. In one embodiment, operation 908B is not performed.

At 910, the Viterbi detector 144 receives the phase rotated signals from the FIR filters and/or phase rotators of the equalizer 210 and determines a most likely data sequence (i.e. most likely code word) for the received phase rotated signals. One of the phase rotated signals may be referred to as a non-phase rotated signal or a zero-phase rotated signal and correspond to the center FIR filter or phase rotator that does not phase rotate the digital signal. At 910A, the Viterbi detector 144 determines branch metric values for each of the sub-branches of the Viterbi detector 144. This includes calculating for each main branch (i) a branch metric for a current phase of the digital signal out of the A/D converter (or zero-phase rotated digital signal), and (ii) branch metrics for the other phase rotated digital signals. In an embodiment, a branch metric is determined by determining a minimum squaring difference between (i) elements of the vector (or bits of the received bit sequence of one or more symbols) of the corresponding phase of the digital signal, and (ii) elements of a vector (or bits of a code word) of a corresponding value of a sub-branch. The squared differences are then summed to provide the branch metric value for that sub-branch. A branch metric is determined for each sub-branch of the trellis state machine of the Viterbi detector 144.

At 910B, the Viterbi detector 144 determines, for each main branch, which of the branch metric values of the sub-branches is smallest. For each main branch, the vector of the sub-branch that has a branch metric with the smallest branch metric value is the vector determined to most closely match the corresponding received vector. The sub-branch of a main branch with the minimum branch metric value is selected as the represented sub-branch for that main branch. This process is performed for each main branch.

At 910C, the Viterbi detector 144 uses the branch metric values representing the main branches in order to determine the received bit sequence. The branch-metrics of all the main branches are used by an add-compare-select process of the Viterbi algorithm in order to determine the most likely data sequence. The Viterbi detector 144 may include hardware for a code that includes a path metric unit (PMU). The PMU may be referred to as a path metric module. The PMU may implement the add-compare-select process and summarizes branch metrics to obtain metrics for paths. The core elements of a PMU may be referred to as add-compare-select (ACS) units. The way in which the ACS units are connected is defined by a specific code's trellis diagram.

At 912, the servo control module 208 receives the output of the Viterbi detector 144 and controls and/or adjusts location of the read/write head based on the output of the Viterbi detector 144. The method may end at 914.

The above-described operations of FIG. 9 are meant to be illustrative examples; the operations may be performed sequentially, synchronously, simultaneously, continuously, during overlapping time periods or in a different order depending upon the application. Also, any of the operations may not be performed or skipped depending on the implementation and/or sequence of events.

The above-disclosed compensation improves gains for RI that is consistently changing and/or random. The disclosed compensation provides gains for constant RI over a system that does not perform RI compensation. The compensation exhibits negligible loss when there is no RI. This is unlike traditional RI radial incoherence detectors that estimate an amount of radial incoherence, which are more sensitive to noise and thus exhibit more loss when there is no RI. The disclosed compensation provides the stated gains and negligible loss independent of (i) the target and equalizer pair used, and (ii) the modulation code used for writing servo data. The disclosed compensation is only dependent on the RI.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system for compensating radial incoherence while reading servo data from a rotating storage medium, the system comprising:
    an equalizer to (i) receive a digital signal comprising a bit sequence of the servo data read from the rotating storage medium, and (ii) equalize the digital signal via a plurality of filters, wherein at least some of the plurality of filters are to phase rotate the digital signal to generate a plurality of phase rotated signals;
    a Viterbi detector to operate based on a trellis state machine, wherein the trellis state machine comprises a plurality of main branches, wherein each of the plurality of main branches comprises a plurality of sub-branches, wherein each of the plurality of main branches is to receive the plurality of phase rotated signals respectively at corresponding ones of the plurality of sub-branches, and wherein the Viterbi detector is to (i) determine branch metrics for each of the sub-branches, (ii) determine a minimum branch metric among all the branch metrics of the plurality of sub-branches for each of the plurality of main branches, and (iii) process the minimum branch metric as a representative of a corresponding branch using an add-compare-select process of the Viterbi detector to determine a most likely received bit sequence; and
    a servo control module to adjust a location of a read/write head of the rotating storage medium based on the most likely received bit sequence.

2. The system of claim 1, wherein:
    one of the plurality of filters does not phase rotate the digital signal;
    each of the plurality of main branches is to receive a non-rotated output of the one of the plurality of filters at one of the corresponding plurality of the sub-branches; and
    the Viterbi detector is to, for each of the plurality of main branches, determine a branch metric for the corresponding sub-branch that received the non-rotated output.

3. The system of claim 1, wherein:
    the plurality of filters provide respective outputs;
    each of the plurality of main branches receives the outputs of the plurality of filters; and
    the sub-branches of each of the main branches receives a respective one of the outputs of the plurality of filters.

4. The system of claim 1, wherein the plurality of filters comprise:
    a first filter to negative phase rotate the digital signal; and
    a second filter to positive phase rotate the digital signal.

5. The system of claim 4, wherein:
    the first filter negative phase rotates the digital signal relative to a current phase of the digital signal by a predetermined amount of phase; and
    the second filter positive phase rotates the digital signal relative to the current phase of the digital signal by the predetermined amount of phase.

6. The system of claim 1, wherein the plurality of filters include finite impulse response filters.

7. A servo channel comprising:
    the system of claim 1;
    the read/write head to generate an analog signal;
    a preamplifier to amplify the analog signal; and
    an analog-to-digital converter to sample the analog signal to generate the digital signal.

8. A system for compensating radial incoherence while reading servo data from a rotating storage medium, the system comprising:
    an equalizer comprising a filter and a plurality of phase rotators, wherein the filter is to (i) receive a digital signal comprising a bit sequence of the servo data read from the rotating storage medium, and (ii) filter the digital signal, and wherein at least some of the plurality of phase rotators are to phase rotate an output of the filter to provide a respective one of a plurality of phase rotated signals;
    a Viterbi detector to operate based on a trellis state machine, wherein the trellis state machine comprises a plurality of main branches, wherein each of the plurality of main branches comprises a plurality of sub-branches, wherein each of the plurality of main branches is to receive the plurality of phase rotated signals respectively at corresponding ones of the plurality of sub-branches, and wherein the Viterbi detector is to (i) determine branch metrics for each of the sub-branches, (ii) determine a minimum branch metric among all the branch metrics of the plurality of sub-branches for each of the plurality of main branches, and (iii) process the minimum branch metric as a representative of a corresponding branch using an add-compare-select process of the Viterbi detector to determine a most likely received bit sequence; and
    a servo control module to adjust a location of a read/write head of the rotating storage medium based on the most likely received bit sequence.

9. The system of claim 8, wherein:
    one of the plurality of phase rotators is a zero phase rotator and does not phase rotate the digital signal;
    each of the plurality of main branches is to receive a non-rotated output of the one of the plurality of phase rotators at one of the corresponding plurality of the sub-branches; and
    the Viterbi detector is to, for each of the plurality of main branches, determine a branch metric for the corresponding sub-branch that received the non-rotated output.

10. The system of claim 8, wherein:
    the plurality of phase rotators provide respective outputs;
    each of the plurality of main branches receives the outputs of the plurality of phase rotated signals; and
    the sub-branches of each of the main branches receives a respective one of the outputs of the plurality of phase rotated signals.

11. The system of claim 8, wherein the plurality of phase rotators comprise:
    a first phase rotator to negative phase rotate the digital signal; and a second phase rotator to positive phase rotate the digital signal.

12. The system of claim 11, wherein:
the first phase rotator negative phase rotates the digital signal relative to a current phase of the digital signal by a predetermined amount of phase; and
the second phase rotator positive phase rotates the digital signal relative to the current phase of the digital signal by the predetermined amount of phase.

13. A servo channel comprising:
the system of claim 8;
the read/write head to generate an analog signal;
a preamplifier to amplify the analog signal; and
an analog-to-digital converter to sample the analog signal to generate the digital signal.

14. A method for compensating radial incoherence while reading servo data from a rotating storage medium, the method comprising:
receiving a digital signal comprising a bit sequence of the servo data read from the rotating storage medium;
equalizing the digital signal via at least one filter;
rotating the digital signal or at least one output of the at least one filter to generate a plurality of phase rotated signals, wherein the plurality of phase rotated signals are generated concurrently;
receiving at each of a plurality of main branches of a Viterbi detector the plurality of phase rotated signals, wherein the Viterbi detector is to operate based on a trellis states machine, wherein the trellis state machine comprises the plurality of main branches, each of the plurality of main branches comprises a plurality of sub-branches, and wherein the plurality of phase rotated signals are received respectively at corresponding ones of the plurality of sub-branches,
determining branch metrics for each of the sub-branches;
determining a minimum branch metric among all the branch metrics of the plurality of sub-branches for each of the plurality of main branches;
processing the minimum branch metric as a representative of a corresponding branch using an add-compare-select process of the Viterbi detector to determine a most likely received bit sequence; and
adjusting a location of a read/write head of the rotating storage medium based on the most likely received bit sequence.

15. The method of claim 14, further comprising:
receiving a non-rotated output of one of the at least one filter at one of the corresponding plurality of the sub-branches of each of the plurality of main branches, wherein the one of the at least one filter does not phase rotate the digital signal; and
for each of the plurality of main branches, determining a branch metric for the corresponding sub-branch that received the non-rotated output via the Viterbi detector.

16. The method of claim 14, further comprising:
receiving a non-rotated output of one of a plurality of phase rotators at one of the corresponding plurality of the sub-branches of each of the plurality of main branches,
wherein the at least one filter comprises a plurality of filters;
phase rotate outputs of the plurality of filters via some of the plurality of phase rotators to generate the plurality of phase rotated signals, wherein one of the plurality of phase rotators is a zero phase rotator and does not phase rotate the digital signal; and
for each of the plurality of main branches, determining a branch metric for the corresponding sub-branch that received the non-rotated output via the Viterbi detector.

17. The method of claim 14, further comprising:
receiving outputs of a plurality of filters at each of the plurality of main branches, wherein the at least one filter comprises the plurality of filters; and
receiving a respective one of the outputs of the plurality of filters at the sub-branches of each of the main branches.

18. The method of claim 17, further comprising via the plurality of filters:
negative phase rotating the digital signal via a first filter; and
positive phase rotating the digital signal via a second filter.

19. The method of claim 18, wherein:
the digital signal is negative phase rotated relative to a current phase of the digital signal by a predetermined amount of phase; and
the digital signal is positive phase rotated relative to the current phase of the digital signal by the predetermined amount of phase.

20. The method of claim 14, wherein the at least one filter includes a finite impulse response filter.

* * * * *